US010429002B2

United States Patent
Carnevali (10) Patent No.: US 10,429,002 B2
(45) Date of Patent: Oct. 1, 2019

(54) TOP-LOADING MOUNTING TRACK FOR RECEIVING A MOUNT ASSEMBLY

(71) Applicant: National Products, Inc., Seattle, WA (US)

(72) Inventor: Jeffrey D. Carnevali, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 0 days.

(21) Appl. No.: 15/627,102

(22) Filed: Jun. 19, 2017

(65) Prior Publication Data
US 2018/0363842 A1    Dec. 20, 2018

(51) Int. Cl.
| | |
|---|---|
| *F16M 13/02* | (2006.01) |
| *F16M 11/14* | (2006.01) |
| *F16M 11/42* | (2006.01) |
| *F16B 37/04* | (2006.01) |
| *F16B 45/00* | (2006.01) |
| *E05B 1/00* | (2006.01) |

(52) U.S. Cl.
CPC ......... *F16M 13/022* (2013.01); *F16B 37/045* (2013.01); *F16M 11/14* (2013.01); *F16M 11/42* (2013.01); *F16M 13/02* (2013.01); *E05B 1/0084* (2013.01); *F16B 45/00* (2013.01); *F16M 2200/025* (2013.01); *F16M 2200/08* (2013.01)

(58) Field of Classification Search
CPC ......... F16M 13/022; F16M 2200/0258; F16M 2200/08; F16M 2200/025; F16M 11/14; F16M 11/42; F16M 13/02; B60P 7/0815; B60P 7/08; B61D 45/00; F16B 2/065; F16B 37/045; B63B 2035/715; E05B 1/0084

USPC ............... 248/298.1, 223.41, 224.51, 224.61
See application file for complete search history.

(56) References Cited

U.S. PATENT DOCUMENTS

| | | |
|---|---|---|
| 180,881 A | 8/1876 | Howson |
| 538,534 A | 4/1895 | Neill |
| 596,729 A | 1/1898 | White |
| | (Continued) | |

OTHER PUBLICATIONS

Yakattack.us, 7 pages of product description of GearTrac retrieved from web site at: www.yakattack.us/by-product-name/geartrac/.

(Continued)

*Primary Examiner* — Christopher Garft
(74) *Attorney, Agent, or Firm* — Lowe Graham Jones PLLC; Bruce E. Black (57) ABSTRACT

A top-loading mounting track includes a top-loading track section with a base; two beams extending over a portion of the base; and two rails extending opposite each other from the base and connecting the base to the beams. The beams are laterally spaced apart from each other by a first distance. Each rail includes an inner rail wall defining a shoulder portion; an insertion-pocket portion; and an angled guide-surface portion. The insertion-pocket portions are laterally spaced apart from each other by a second distance that is larger than the first distance. The track section can receive a retention element of a mount assembly, where the retention element has a smallest lateral dimension greater than the first distance. The track section can receive the retention element by passing the retention element between the beams with the retention element angled toward one of the insertion-pocket portions.

19 Claims, 11 Drawing Sheets

(56) References Cited

U.S. PATENT DOCUMENTS

| | | | |
|---|---|---|---|
| 855,149 A | 5/1907 | Vaughn et al. | |
| 890,656 A | 6/1908 | Johnson | |
| 892,105 A | 6/1908 | White | |
| 958,052 A | 5/1910 | Williams | |
| 1,009,913 A | 11/1911 | Maguire et al. | |
| 1,280,013 A | 9/1918 | Goddard | |
| 1,359,645 A | 11/1920 | Zink | |
| 1,455,441 A | 5/1923 | Hodny | |
| 1,509,068 A | 9/1924 | Herron | |
| 1,934,223 A | 11/1933 | Booth | |
| 2,114,767 A | 4/1938 | Hodny et al. | |
| 2,121,317 A | 6/1938 | Cohen | |
| D142,057 S | 8/1945 | Baxter | |
| 2,560,556 A | 7/1951 | Creedon | |
| 2,752,173 A | 6/1952 | Krooss | |
| 2,650,788 A | 9/1953 | Hulstein | |
| 2,710,609 A | 6/1955 | Giller | |
| 2,723,823 A | 11/1955 | Polk | |
| 2,859,710 A * | 11/1958 | Elsner | A47B 91/08 248/502 |
| 2,861,501 A | 11/1958 | Strelakos | |
| 3,096,061 A | 7/1963 | Bertell | |
| 3,843,272 A | 10/1974 | Jorn | |
| 4,060,241 A | 11/1977 | Hegel | |
| 4,060,331 A | 11/1977 | Domer et al. | |
| 4,066,231 A | 1/1978 | Bahner | |
| 4,066,311 A | 1/1978 | Poulson | |
| D247,420 S | 3/1978 | Reynolds | |
| 4,222,680 A | 9/1980 | Browning | |
| 4,225,258 A | 9/1980 | Thompson | |
| 4,307,864 A | 12/1981 | Benoit | |
| 4,461,284 A | 7/1984 | Fackler | |
| 4,491,435 A | 1/1985 | Meier | |
| 4,585,197 A | 4/1986 | Liautaud et al. | |
| 4,611,839 A | 9/1986 | Rung et al. | |
| 4,620,813 A | 11/1986 | Lacher | |
| 4,796,508 A | 1/1989 | Hoshino | |
| 4,800,795 A | 1/1989 | Yamashita | |
| 4,842,308 A | 6/1989 | Spotts | |
| 4,872,630 A | 10/1989 | Cooper | |
| 4,950,099 A * | 8/1990 | Roellin | B62D 33/044 403/348 |
| 5,071,279 A | 12/1991 | Rustrom | |
| 5,092,551 A | 3/1992 | Meier | |
| 5,109,321 A | 4/1992 | Maglica et al. | |
| 5,118,058 A | 6/1992 | Richter | |
| 5,251,859 A | 10/1993 | Cyrell et al. | |
| 5,270,911 A | 12/1993 | Maglica et al. | |
| 5,305,700 A * | 4/1994 | Strong | B63H 9/10 114/112 |
| 5,419,522 A | 5/1995 | Luecke et al. | |
| 5,441,225 A | 8/1995 | Hall | |
| 5,564,668 A | 10/1996 | Crowe, II | |
| 5,628,597 A * | 5/1997 | Chudoba | F16B 37/046 411/85 |
| 5,727,858 A | 3/1998 | Shapiro | |
| 5,823,724 A * | 10/1998 | Lee | B60P 7/0815 410/104 |
| 5,845,885 A | 12/1998 | Carnevali | |
| 6,173,926 B1 | 1/2001 | Elvegaard | |
| 6,561,476 B2 | 5/2003 | Carnevali | |
| 6,581,892 B2 | 6/2003 | Carnevali | |
| 6,588,722 B2 * | 7/2003 | Eguchi | B60N 2/01591 248/298.1 |
| 6,666,420 B1 | 12/2003 | Carnevali | |
| 6,688,568 B1 * | 2/2004 | Moufflet | A47B 96/067 211/103 |
| 7,090,181 B2 | 8/2006 | Biba et al. | |
| D539,639 S | 4/2007 | Nagle | |
| 7,277,240 B2 | 10/2007 | Carnevali | |
| 7,320,450 B2 | 1/2008 | Carnevali | |
| D563,781 S | 3/2008 | Carnevali | |
| D564,062 S | 3/2008 | Carnevali | |
| 7,422,184 B2 | 9/2008 | Carnevali | |
| D588,903 S | 3/2009 | Carnevali | |
| D589,327 S | 3/2009 | Carnevali | |
| D590,696 S | 4/2009 | Carnevali | |
| 7,523,904 B2 | 4/2009 | Carnevali | |
| 7,551,458 B2 | 6/2009 | Carnevali | |
| 7,556,463 B1 * | 7/2009 | Hall | B60P 7/0815 410/104 |
| 7,571,522 B2 | 8/2009 | Carnevali | |
| 7,607,622 B2 | 10/2009 | Carnevali | |
| 7,682,543 B2 | 3/2010 | Carnevali | |
| 7,731,140 B2 | 6/2010 | Carnevali | |
| 7,774,973 B2 | 8/2010 | Carnevali | |
| D629,080 S | 12/2010 | Dole et al. | |
| 7,849,630 B2 | 12/2010 | Carnevali | |
| 7,850,133 B2 | 12/2010 | Carnevali | |
| RE42,060 E | 1/2011 | Carnevali | |
| 7,887,018 B2 | 2/2011 | Carnevali | |
| 7,950,701 B2 | 5/2011 | Dole et al. | |
| 7,954,773 B2 | 6/2011 | Carnevali | |
| 7,975,971 B2 | 7/2011 | Carnevali | |
| RE42,581 E | 8/2011 | Carnevali | |
| 7,988,106 B2 | 8/2011 | Carnevali | |
| 8,020,828 B2 | 9/2011 | Carnevali | |
| 8,037,904 B2 | 10/2011 | Carnevali | |
| 8,156,681 B2 | 4/2012 | Carnevali | |
| 8,201,788 B2 | 6/2012 | Carnevali | |
| 8,235,340 B2 | 8/2012 | Carnevali | |
| RE43,806 E | 11/2012 | Carnevali | |
| 8,454,178 B2 | 6/2013 | Carnevali | |
| 8,505,861 B2 | 8/2013 | Carnevali | |
| 8,590,855 B2 | 11/2013 | Carnevali | |
| 9,056,580 B2 | 6/2015 | Baldsiefen et al. | |
| 9,180,925 B2 | 11/2015 | Carnevali | |
| 9,253,970 B2 | 2/2016 | Carnevali | |
| 9,365,150 B2 | 6/2016 | Baldsiefen et al. | |
| 9,671,060 B1 * | 6/2017 | Cifers | F16M 13/02 |
| 9,828,073 B1 * | 11/2017 | Cifers, III | B63B 35/71 |
| 9,944,217 B2 | 4/2018 | Schroeder et al. | |
| 2005/0092876 A1 | 5/2005 | Carnevali | |
| 2006/0000957 A1 | 1/2006 | Carnevali | |
| 2006/0102823 A1 | 5/2006 | Carnevali | |
| 2008/0115344 A1 | 5/2008 | Carnevali | |
| 2008/0296334 A1 | 12/2008 | Carnevali | |
| 2009/0108151 A1 | 4/2009 | Carnevali | |
| 2009/0108152 A1 | 4/2009 | Carnevali | |
| 2009/0140112 A1 | 6/2009 | Carnevali | |
| 2009/0241293 A1 | 10/2009 | Swerdlick | |
| 2010/0282802 A1 | 11/2010 | Carnevali | |
| 2010/0284199 A1 | 11/2010 | Carnevali | |
| 2011/0097177 A1 | 4/2011 | Carnevali | |
| 2012/0006948 A1 | 1/2012 | Hiss et al. | |
| 2012/0181409 A1 | 7/2012 | Hayahara et al. | |
| 2012/0217353 A1 | 8/2012 | Hennon | |
| 2013/0133158 A1 | 5/2013 | Tran | |
| 2014/0003878 A1 * | 1/2014 | Knox | B60P 7/0807 410/104 |
| 2014/0034794 A1 | 2/2014 | Carnevail | |
| 2014/0248103 A1 | 9/2014 | Baldsiefen et al. | |
| 2015/0030386 A1 | 1/2015 | Carnevali | |

OTHER PUBLICATIONS

Yakattack.us, 4 pages of product description of GTTL retrieved from web site at: www.yakattack.us/geartrac/gttl/.

Yakattack.us, 6 pages of product description of GTSL90 retrieved from web site at: www.yakattack.us/by-product-name/geartrac/gtsl90/.

Yakattack.us, 5 pages of product description GT90 retrieved from web site at: www.yakattack.us/geartrac/gt90/.

Yakattack.us, 4 pages of product description of GT175 retrieved from web site at: www.yakattack.us/geartrac/gt175/.

U.S. Appl. No. 15/650,732, filed Jul. 14. 2017.
U.S. Appl. No. 15/612,764, filed Jun. 2, 2017.
U.S. Appl. No. 15/650,726, filed Jul. 14, 2017.
U.S. Appl. No. 15/612,798, filed Jun. 2, 2017.

* cited by examiner

TOP-LOADING MOUNTING TRACK FOR RECEIVING A MOUNT ASSEMBLY

FIELD

The present invention is directed to the area of mounting track systems. The present invention is also directed to a mounting track configured for receiving a mount assembly from a position over the mounting track and retaining the mount assembly along a continuous track.

BACKGROUND

Providing mounts for holding, retaining, or securing objects has proven beneficial for many different uses. Some mountable-objects, such as electronic devices (e.g., phones, laptops, tablets, visual-enhancement devices, positioning devices, or the like), are increasingly used in situations where mounting the object to a surface increases the convenience of using the object. For example, in the case of hand-held devices, mounts eliminate the need to hold the device, or prop the device up, in order to use the device, thereby allowing a user to use the device, while simultaneously engaging in other activities which may benefit from the use of both hands without the encumberment of holding or propping-up the device. In some instances, mounting the device may increase user safety by enabling use of the device, without the distraction of holding the device.

Track systems enable an object to be held, retained, or secured, while also enabling limited movement of the object along a fixed path, or track. Attaching track systems to a surface provides a way to mount an object to the surface while also allowing flexibility of positioning of the object along portions of the surface along which the track system extends. Handles have many uses, including facilitating grasping, lifting, or carrying an object.

BRIEF SUMMARY

In one embodiment, a top-loading mounting track includes at least one top-loading track section. Each top-loading track section includes a base; two beams, where each of the beams extends over a portion of the base toward the other beam; and two rails extending opposite each other from the base, each rail of the two rails connecting the base to a different one of the two beams. Each of the beams has a top surface and an opposing bottom surface. The beams are laterally spaced apart from each other by a gap having a first distance. Each rail includes an inner rail wall and an opposing outer rail wall. The inner rail wall of each of the two rails defines a shoulder portion extending from the base; an insertion-pocket portion extending from the shoulder portion and towards the opposing outer rail wall; and an angled guide-surface portion extending linearly between the insertion-pocket portion and the bottom surface of one of the two beams. The insertion-pocket portions of the two rails are laterally spaced apart from each other by a second distance that is larger than the first distance. The at least one top-loading track section is configured and arranged to receive a retention element of a mount assembly, where the retention element has a smallest lateral dimension greater than the first distance. When received, the retention element is enabled to move along the at least one top-loading track section. The at least one top-loading track section is configured and arranged to receive the retention element by passing the retention element through the gap between the two beams of the at least one top-loading track section from a position over the top surfaces of the two beams when the retention element is angled toward one of the insertion-pocket portions.

In at least some embodiments, the bottom surface of each of the two beams forms an angle with a first axis of the at least one top-loading track section, defined by opposing tips of the two beams, that is no less than 1 degree and no more than 10 degrees. In at least some embodiments, the angled guide-surface portion of each of the two rails forms an angle with a second axis of the at least one top-loading track section, perpendicular to the base, that is no less than 20 degrees and no more than 60 degrees. In at least some embodiments, the angled guide-surface portion of each of the two rails forms an angle with a second axis of the at least one top-loading track section, perpendicular to the base, that is no less than 25 degrees and no more than 45 degrees.

In at least some embodiments, the angled guide-surface portion of each of the two rails extends linearly between the insertion-pocket portion and the bottom surface of one of the two beams without forming any bumps, protrusions, or undulations.

In at least some embodiments, the insertion-pocket portion of each of the two rails extends to a position that is below a topmost part of the shoulder portion from which the insertion-pocket portion extends.

In at least some embodiments, the at least one top-loading track section has a first end and an opposing second end, and each of the first end and the second end are closed.

In at least some embodiments, the top-loading mounting track further includes at least one additional track section coupled to the at least one top-loading track section to form a continuous track with the at least one top-loading track section.

In at least some embodiments, at least one top-loading track section defines a fastening aperture disposed along the base between the shoulder portions of each of the two rails, the fastening aperture configured and arranged for receiving a fastener for fastening the at least one top-loading track section to a surface.

In another embodiment, a handle with a top-loading mounting track includes a handle section; at least one leg extending from the handle section and attachable to a surface; and the top-loading mounting track described above disposed along at least a portion of the handle section. When the at least one leg is attached to the surface, the handle section forms a graspable handle.

In yet another embodiment, a top-loading track-mounting system includes the top-loading mounting track described above; and a mount assembly coupleable to the top-loading mounting track. The mount assembly includes a mount coupled to a retention element. The retention element including a flange with a smallest lateral dimension that is greater than the first distance of the gap between the two beams of the top-loading mounting track and at least one lateral dimension that is less than the second distance between the insertion-pocket portions of the two rails of the top-loading mounting track. The retention element is configured and arranged for insertion into the top-loading mounting track by passing the retention element through the gap between the two beams of the at least one top-loading track section of the mount assembly from a position over the top surfaces of the two beams. In at least some embodiments, the retention element is one of a T-bolt or a T-nut. In at least some embodiments, the mount is one of a ball or a cleat.

In still yet another embodiment, a method of coupling a mount assembly to a top-loading mounting track includes providing the top-loading mounting track described above; and inserting a retention element of a mount assembly into the at least one top-loading track section of the top-loading mounting track from a position over the top surfaces of the two beams of the at least one top-loading track section to retain the retention element within the top-loading mounting track.

In at least some embodiments, inserting a retention element of a mount assembly into the at least one top-loading track section includes tilting the mount assembly to a non-parallel angle relative to a first axis of the at least one top-loading track section, the first axis defined by opposing tips of the two beams of the at least one top-loading track section; extending a first end of the retention element through the gap between the two beams of the at least one top-loading track section and into the insertion-pocket portion of one of the two rails; and pivoting the mount assembly about the first end of the retention element to extend an opposing second end of the retention element through the gap between the two beams and into the insertion-pocket of the other of the two rails.

In at least some embodiments, the above-described method further includes tightening the mount assembly against the at least one top-loading track section to retain the mount assembly at a mounting location along a length of the top-loading mounting track.

In at least some embodiments, tightening the mount assembly against the at least one top-loading track section includes moving the retention element from the insertion-pocket portions away from the base along the angled guide-surface portions of the two rails to the bottom surfaces of the two beams, the angled guide-surface portions of the two rails facilitating guidance of the retention element to a position beneath the bottom surfaces of the two beams; and pressing the two beams between a top surface of the retention element and a bottom surface of a mount of the mount assembly to retain the mount assembly.

In at least some embodiments, the above-described method further includes fastening the top-loading mounting track to a surface. In at least some embodiments, the above-described method further includes disposing the top-loading mounting track along a handle section of a handle that includes at least one leg attachable to the handle section. In at least some embodiments, the above-described method further includes fastening the at least one leg to a surface.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of mounting track systems. The present invention is also directed to a mounting track configured for receiving a mount assembly from a position over the mounting track and retaining the mount assembly along a continuous track.

A top-loading mounting track includes a continuous track formed along at least one top-loading track section along which a mount assembly can move. The continuous track retains a retention element of the mount assembly to restrict movement of the mount assembly to positions along the continuous track. The top-loading track section enables the retention element of the mount assembly to be inserted onto the continuous track from a position over the track.

The top-loading mounting track can, optionally, be attached to a surface (e.g., a vehicle surface, a dock, a countertop, a railing, a gunwale, a cabinet, a table, a floor, a wall, a ceiling, a ledge, or the like). The top-loading mounting track can be configured to the size and shape of the surface to which the top-loading mounting track is attached. The top-loading mounting track can be used to retain any suitable type of mount (e.g., a ball mount, a cleat, or the like or combinations thereof). The top-loading mounting track can be used to retain any suitable number of mount assemblies (e.g., one, two three, four, five, six, seven, eight, nine, ten, twenty, or more mount assemblies).

Retained mounts can be used to hold, retain, or secure any suitable type of object. In some embodiments, a retained mount provides a docking feature for docking with an object, such as an electronic device. In some embodiments, a retained mount is attached to an additional mount or holder that facilitates docking or retention of an object. In some embodiments, the mount can be used to secure the surface to which it is attached to another object. In some embodiments, the mount includes one or more guide features to enable the mount to be retained in the top-loading mounting track in a particular orientation relative to the top-loading mounting track.

Figure 1A:
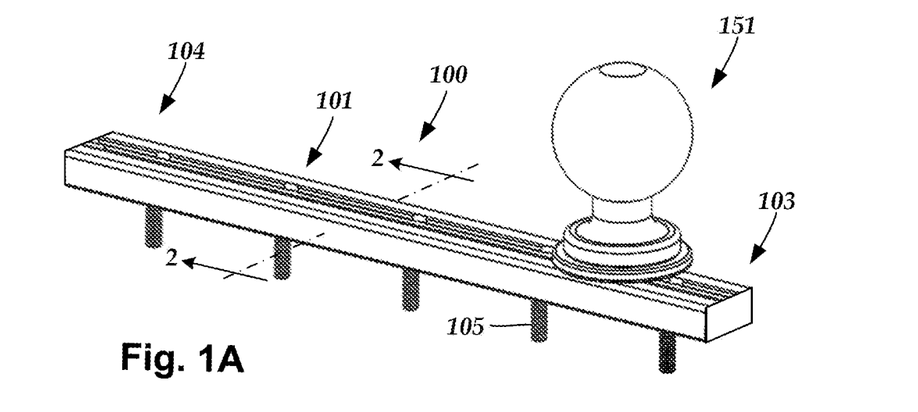
FIG. 1A is a schematic perspective view of one embodiment of a mount assembly received by a top-loading mounting track, according to the invention.
Figure 1B:
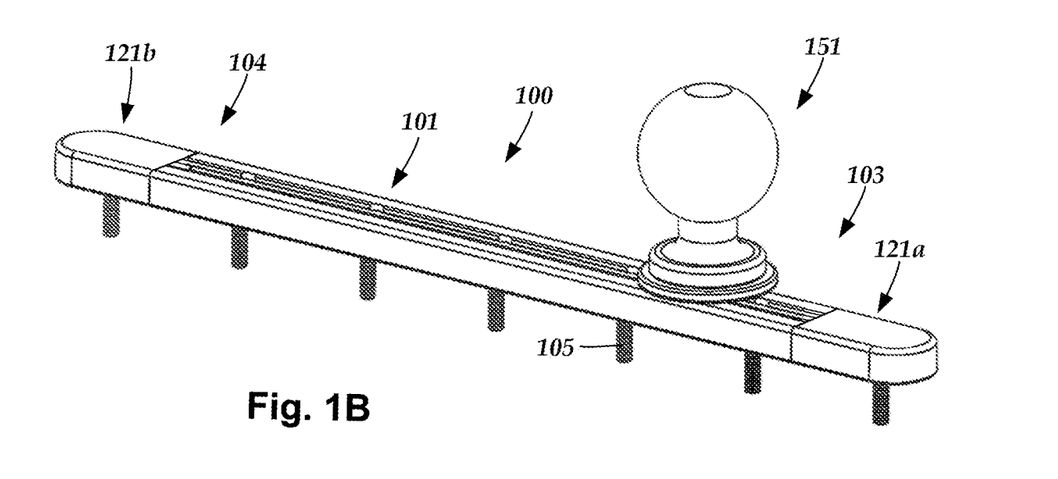
FIG. 1B is a schematic perspective view of another embodiment of a mount assembly received by a top-loading mounting track, according to the invention.

FIG. 1A shows, in transverse perspective view, one embodiment of a mount assembly 151 disposed along a top-loading track section 101 of a top-mounting top-loading mounting track 100. The top-loading track section 101 includes a first end 103 and a second end 104. The ends 103, 104 can be open or closed. In FIG. 1A, the ends 103, 104 of the top-loading track section 101 are shown closed. FIG. 1B shows optional endpieces 121a, 121b coupled to the ends 103, 104, respectively, of the top-loading track section 101.

The mount assembly 151 is movable along a continuous track formed along the top-loading track section 101. In at least some embodiments, the mount assembly 151 can be tightened against the top-loading track section 101 to maintain a desired position along a length of the track (see e.g., FIG. 4E).

FIGS. 1A-1B show a single track section 101. In at least some embodiments, the top-loading track section is open along at least one of the ends and can be coupled to one or more other track sections (top-loading, non-top-loading, or both) to lengthen the continuous track. In embodiments with open ends, the endpieces 121a, 121b of FIG. 1B can, optionally, be used to close the open ends of the track sections. The top-loading mounting track can include any suitable number of track sections (e.g., one, two three, four, five, six, seven, eight, nine, ten, twenty, or more track sections).

The top-loading mounting track can, optionally, be attached to a surface. The top-loading mounting track can be attached to a surface in any suitable manner including, for example, one or more adhesives, or one or more fasteners (e.g., screws, nails, pins, or the like), hook and loop fasteners, or combinations thereof. FIGS. 1A-1B show fasteners, such as fastener 105, extending below the track section 101 to fasten the track section 101 to a surface.

Figure 2A:
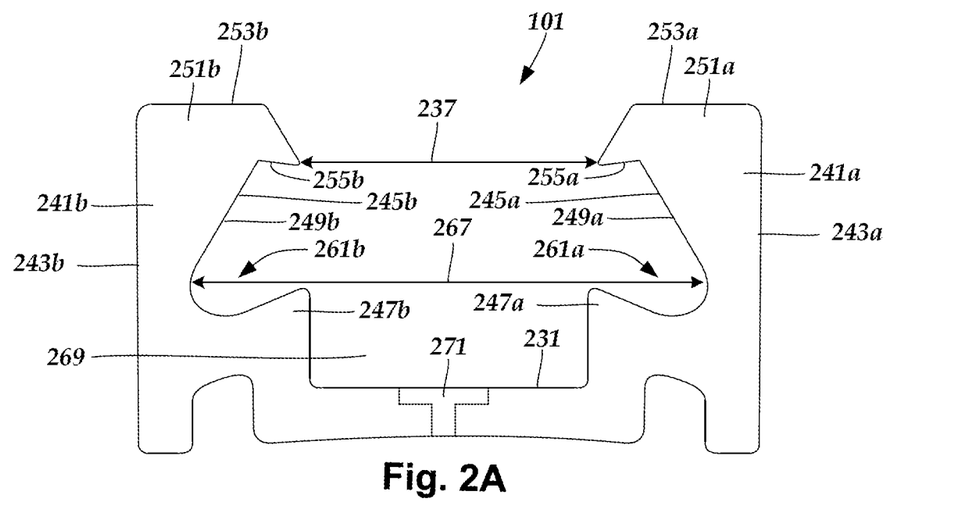
FIGS. 2A-2B are schematic transverse cross-sectional views of one embodiment of the top-loading mounting track of FIGS. 1A-1B, according to the invention.
Figure 2B:
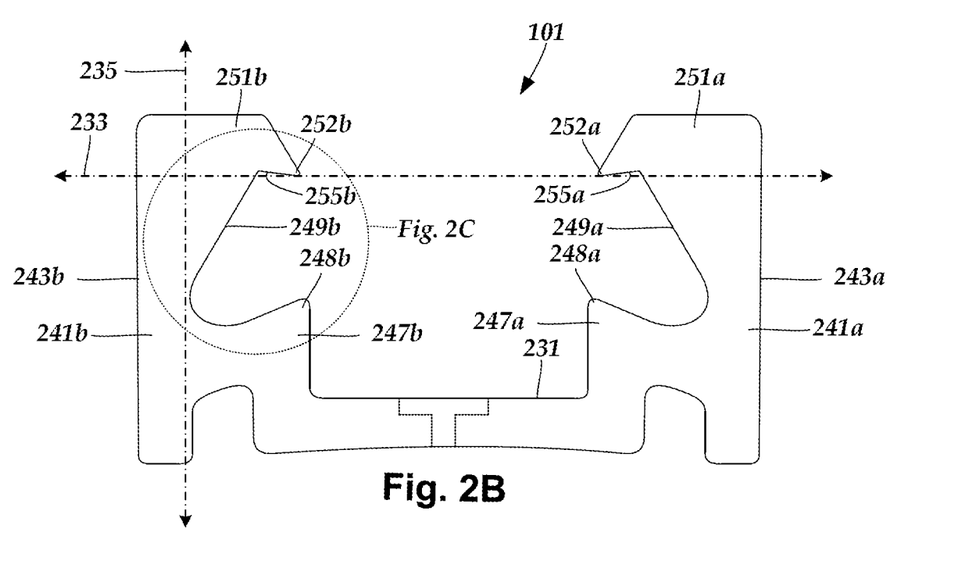

FIGS. 2A-2B show, in transverse cross-sectional view, one embodiment of the top-loading track section 101. As shown in FIG. 2A, the top-loading track section 101 includes a base 231 and two rails 241a, 241b extending opposite each other from the base 231. Two beams 251a, 251b extend from the rails 241a, 241b, respectively, over the base 231 towards each other.

The beams 251a, 251b each include a top surface 253a, 253b, respectively, and an opposing bottom surface 255a, 255b, respectively. The beams 251a, 251b are laterally spaced apart from each other by a gap having a first distance 237. In at least some embodiments, the beams 251a, 251b are laterally spaced apart from each other by a first distance 237 along an entire longitudinal length of the track.

The rails 241a, 241b each include an inner rail wall 245a, 245b, respectively, and an opposing outer rail wall 243a, 243b, respectively. The inner rail walls 245a, 245b each include a shoulder portion 247a, 247b, respectively extending from the base 231. The inner rail walls 245a, 245b each include angled guide-surface portions 249a, 249b, respectively, extending from the shoulder portions 247a, 247b, respectively, to the bottom surfaces 255a, 255b, respectively, of the beams 251a, 251b, respectively.

The inner rail walls 245a, 245b each further include insertion-pocket portions 261a, 261b formed at the interfaces between the angled guide-surface portions 249a, 249b, respectively, and the shoulder portions 247a, 249b. The insertion-pocket portions 261a, 261b are laterally spaced apart from each other by a second distance 267 that is larger than the first distance 237. In at least some embodiments, the second distance 267 is larger than the first distance 237 by at least 5%, 10%, 15%, 20%, 25%, 30%, 35%, or more.

A space 269 is formed over the base 231 and between the two shoulder portions 247a, 247b. In at least some embodiments, this space 269 can be used to receive portions of the retention element that may extend from the flange (387 in FIGS. 3A-3E), such as a nut or bolt. In at least some embodiments, this space 269 can be used to receive one or more optional guide features extending from the mount assembly (593a, 593b in FIGS. 5A-5B) for enabling the mount assembly to maintain a particular orientation relative to the track.

Turning to FIG. 2B, in at least some embodiments, the insertion-pocket portions 261a, 261b of the rails 241a, 241b, respectively, extend to positions that are below (i.e., closer to the base 231 than) a topmost part 248a, 248b, of the shoulder portions 247a, 247b, respectively. As shown in FIG. 2B, the top-loading track section 101 has a horizontal axis 233 and a vertical axis 235. In at least some embodiments, the horizontal axis 233 is parallel to, or approximately parallel to, tips 252a, 252b of the beams 251a, 251b. In at least some embodiments, the horizontal axis 233 is parallel to, or approximately parallel to, the base 231. In at least some embodiments, the vertical axis 235 is parallel to, or approximately parallel to, the outer rail walls 243a, 243b.

It will be understood that the defined axes of the top-loading track section are for clarity of illustration, and are not meant to be contingent upon the orientation of the top-loading track section. For example, were the top-loading track section to be mounted to a vertical surface so as to extend the outer rail walls 243a, 243b in a horizontal direction, the vertical axis 235 would still maintain the "vertical" name and be parallel to, or approximately parallel to, the outer rail walls 243a, 243b, regardless of the actual orientation of the outer rail walls 243a, 243b.

Figure 2C:
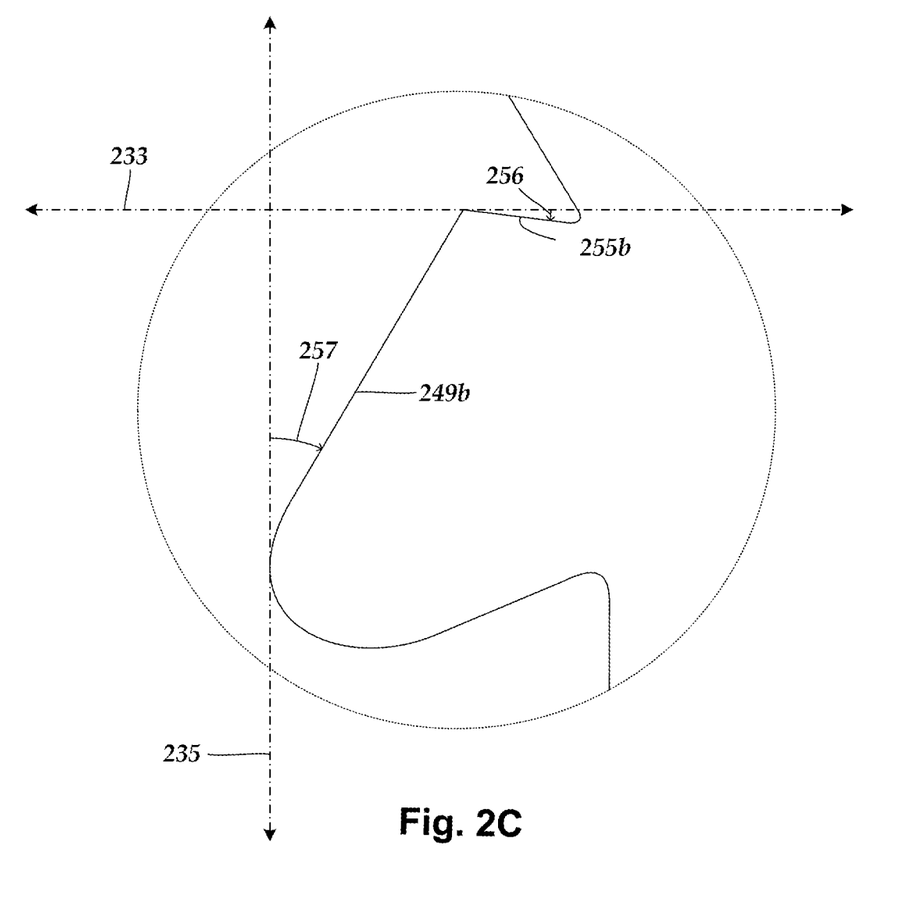
FIG. 2C is a schematic close-up transverse cross-sectional view of one embodiment of a circled portion of the top-loading mounting track of FIG. 2B, according to the invention.

As shown in FIG. 2C, in at least some embodiments the bottom surface 255a, 255b of the beams 251a, 251b, respectively, extend away from the angled guide-surface portions 249a, 249b, respectively, in a downward direction with respect to the horizontal axis 233. In at least some embodiments, the bottom surface 255a, 255b of the beams 251a, 251b, respectively, form angles 256 with the horizontal axis 233 of at least 1°, 2°, 3°, 4°, 5°, 6°, 7°, 8°, 9°, 10°. In at least some embodiments, the bottom surface 255a, 255b of the beams 251a, 251b, respectively, form angles 256 with the horizontal axis 233 that are no less than 1° and no more than 10°. It will be understood that the downward angling of the bottom surface of the beams is optional. In at least some embodiments, the bottom surface 255a, 255b of the beams 251a, 251b, respectively, extend away from the angled guide-surface portions 249a, 249b, respectively, in an upward direction with respect to the horizontal axis 233, or in a direction that is parallel to the horizontal axis 233.

As shown in FIG. 2C, in at least some embodiments the angled guide-surface portions 249a, 249b of the rails 241a, 241b, respectively, form angles 257 with the vertical axis 235 that are no less than 15°, 20°, 25°, 30°, 35°, or 40°. In at least some embodiments, the angled guide-surface portions 249a, 249b of the rails 241a, 241b, respectively, form angles 257 with the vertical axis 235 that are no more than 60°, 55°, 50°, 45°, or 40°. In at least some embodiments, the angled guide-surface portions 249a, 249b of the rails 241a, 241b, respectively, form angles 257 with the vertical axis 235 that are no less than 20° and no more than 60°. In at least some embodiments, the angled guide-surface portions 249a, 249b of the rails 241a, 241b, respectively, form angles 257 with the vertical axis 235 that are no less than 25° and no more than 45°.

As mentioned above, the top-loading mounting track can, optionally, be attached to a surface. FIGS. 1A-1B show fasteners, such as fastener 105, extending below the track section 101 to fasten the track section 101 to a surface. FIGS. 2A-2B show a fastener aperture 271 defined along the base 231 between the two shoulder portions 247a, 247b, configured to receive a fastener, such as fastener 105.

Turning to FIGS. 3A-3E, the top-loading mounting track is configured and arranged to receive a retention element of a mount assembly that, when received, enables the mount assembly to move along the continuous track. The top-loading mounting track is configured and arranged to receive the retention element by passing the retention element between a gap formed between the two beams of the track section from a position over the top surfaces of the two beams. In embodiments of the mounting track with one or more open ends, mount assemblies can, optionally, be received along the open ends in addition to, or in lieu of, top-loading.

FIGS. 3A-3E are schematic side views of one embodiment of a mount assembly being top-loaded into, and retained within, a transverse cross-sectional view of the top-loading mounting track. The mount assembly 151 includes a ball mount 383 with a bottom surface 384. The ball mount 383 is coupled to a retention element 385 that includes a flange 387 and an elongated member 389 configured to couple with the ball mount 383. The retention element 975 and the elongated member can be multiple coupled components, or a single component, such as a T-bolt or T-nut. The mount assembly can, optionally, include multiple retention elements, elongated members, or both.

In at least some embodiments, the flange has a smallest lateral dimension that is greater than the first distance (i.e., the gap between the two horizontal beams) and at least one lateral dimension that is less than the second distance (i.e., the distance between the insertion-pocket portions of the rails), thereby facilitating insertion and retention of the retention element within the continuous track. In at least some of the illustrated embodiments, one of the lateral dimensions of the flange 387 has a first end 388a and an opposing second end 388b.

Figure 3A:
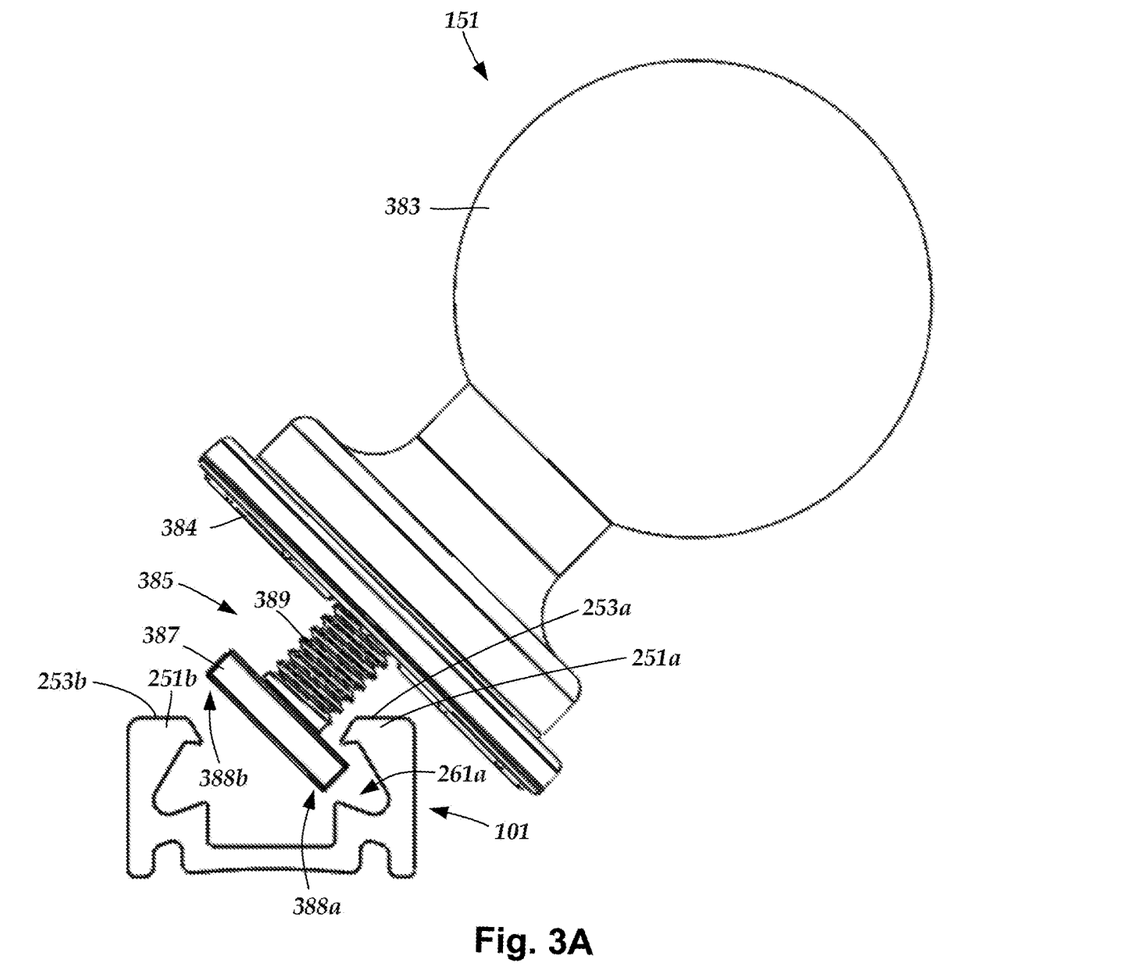
FIGS. 3A-3E are schematic side views of one embodiment of a mount assembly being top-loaded into, and retained within, a transverse cross-sectional view of the top-loading mounting track of FIG. 2, according to the invention.

FIG. 3A shows the mount assembly 151 positioned over the top surfaces 253a, 253b of the beams 251a, 251b with the retention element 385 partially inserted into the track section 101. The mount assembly 151 is tilted at a non-parallel angle relative to the base 231 to enable a portion of the flange 387 to pass through the gap between the beams 251a, 251b. In FIG. 3A, the flange 387 is positioned between the beams 251a, 251b with the first end 388a of the flange 387 extending into the insertion-pocket portion 261a.

Figure 3B:
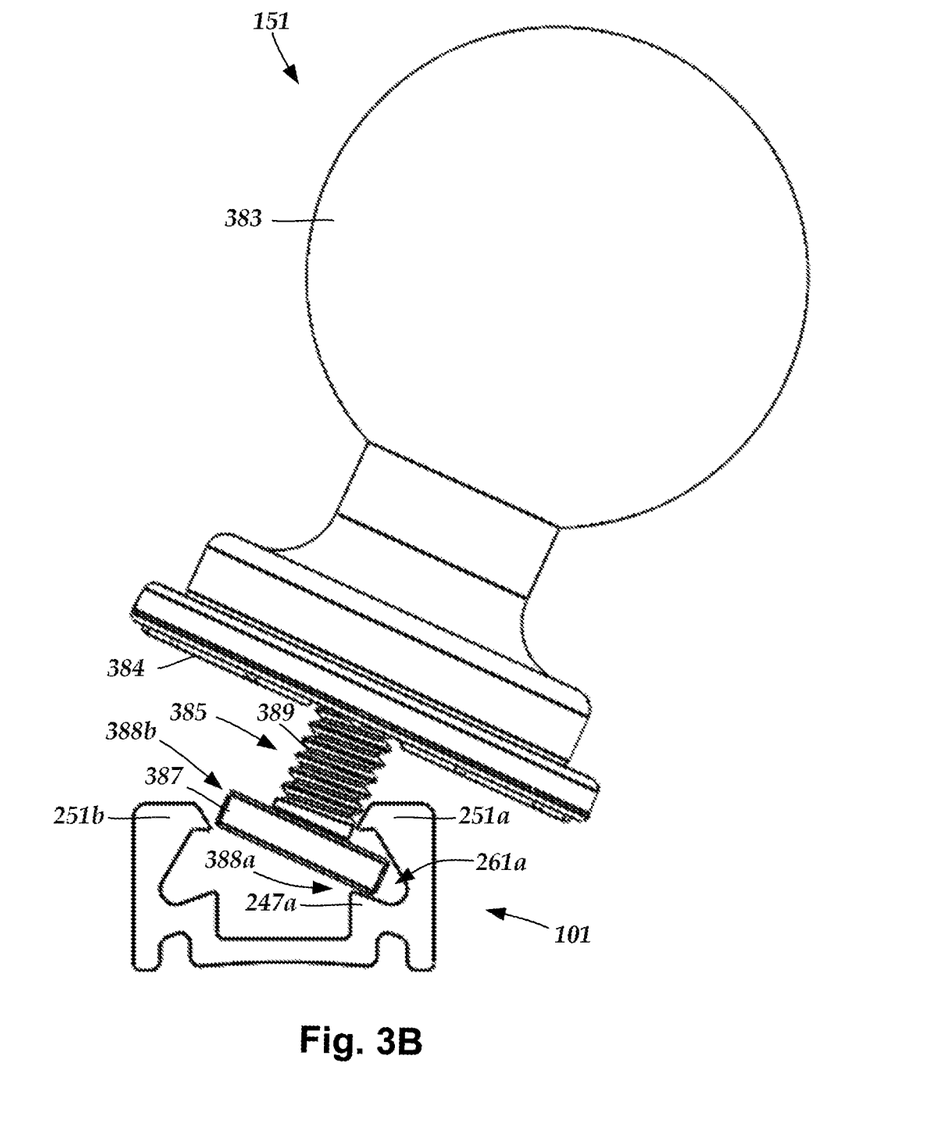

FIG. 3B shows the first end 388a of the flange 387 extending into the insertion-pocket portion 261a and resting on the shoulder portion 247a. The flange 387 is pivoted about the first end 388a of the flange 387 resting on the shoulder portion 247a to bring the second end 388b of the flange 387 through the gap between the beams 251a, 251b and into the track section 101.

Figure 3C:
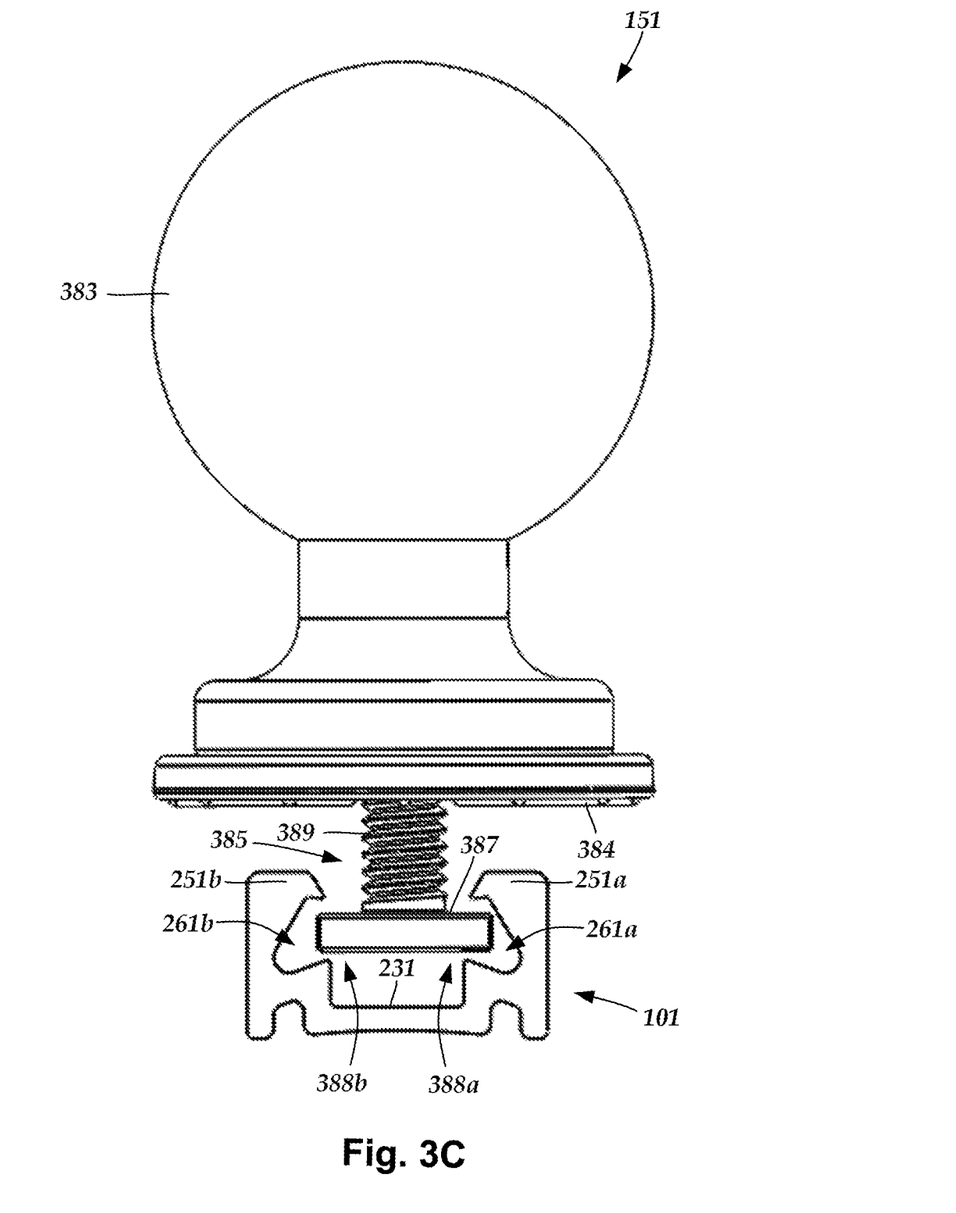

FIG. 3C shows the flange 387 fully passed through the gap between the beams 251a, 251b with opposing ends 388a, 388b of the flange 387 extending into the insertion-pocket portions 261a, 261b, respectively. In at least some embodiments, the retention element 387 does not physically contact the base 231 during insertion of the mount assembly 151 into the track section 101. When the flange 387 is extended into the insertion-pocket portions 261a, 261b, the mount assembly is retained within the track section 101 and moveable along the continuous track, as desired.

Figure 3D:
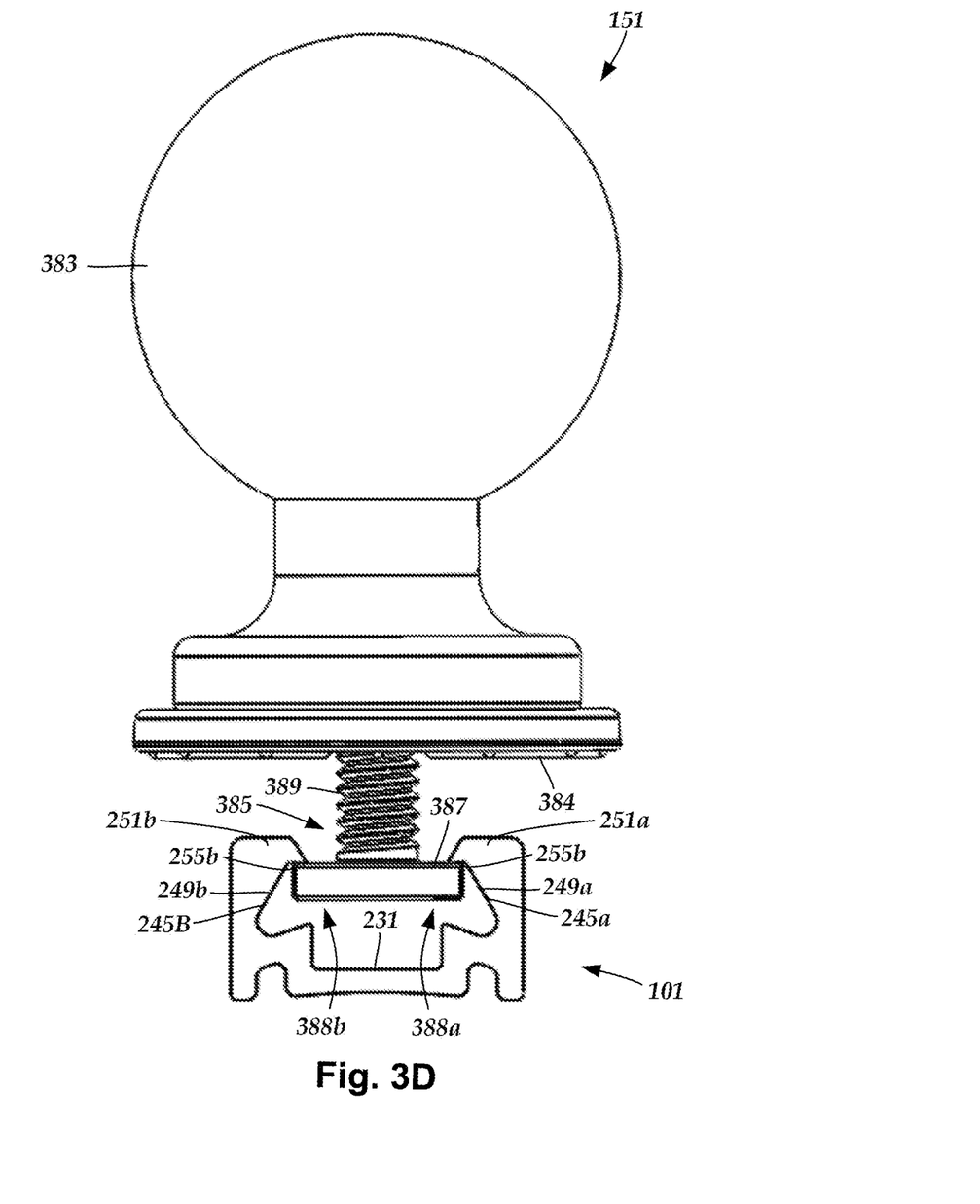

When the mount assembly is positioned along the continuous track at a desired mounting location, the mount assembly can be tightened against the track section so that the mount assembly maintains positioning. FIG. 3D shows the flange 387 moved upwardly (away from base 231) from the position shown in FIG. 3C, while maintaining an approximately parallel orientation relative to the base 231. The angled guide-surface portions 249a, 249b of the inner rail walls 245a, 245b narrow the space between opposing inner rail walls 245a, 245b to facilitate guidance of the flange 387 from the shoulder portions 247a, 247b to the beams 251a, 251b and to center the flange 387 between the inner rail walls 245a, 245b to promote a secure tightening of the retention element to the beams.

In FIG. 3D, a top surface of the flange is contacting the bottom surfaces 255a, 255b of the beams 251a, 251b. In at least some embodiments, a distance between the angled guide-surface portions 249a, 249b where they interface with the bottom surfaces 255a, 255b of the beams 251a, 251b is equal, or approximately equal, to the lateral dimension of the flange 387 that is bounded by the ends 388a, 388b.

Figure 3E:
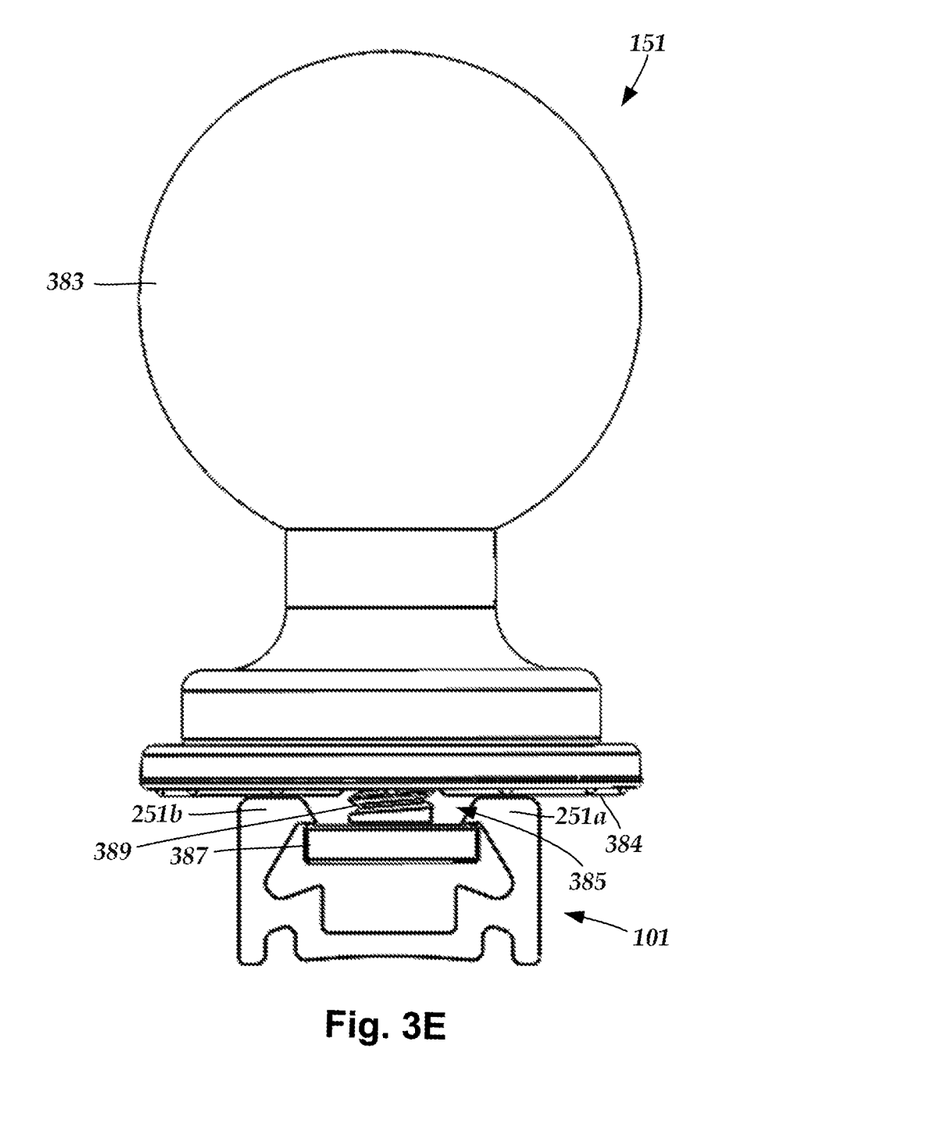

FIG. 3E shows the mount assembly 151 retained along the track section 101. In FIG. 3E, the mount assembly 151 is retained by pressing the beams 251a, 251b between the flange 387 and the bottom surface 384 of the ball mount 383. The mount assembly can be tightened against the track section using any suitable technique. In FIG. 3E, the elongated member 389 of the retention element 385 is threaded to enable the flange 387 to be tightened against the ball mount 383 by rotating the ball mount 383 and retention element 387 relative to one another to insert the threaded elongated member 389 into a threaded bore defined within the ball mount 383, thereby reducing the distance between the ball mount 383 and the flange 387.

In at least some embodiments, the mount assembly includes an optional retention mechanism for enabling the mount assembly to removably maintain a particular location, such as a mounting location, along the top-loading mounting track. For example, instead of rotating the entire ball mount relative to the retention element to tighten the mount assembly to the track, a user may be able to rotate a dial or knob disposed on the mount, or flip a lever attached to the mount, or the like, thereby reversibly actuating the retention mechanism to tighten against a portion of the top-loading mounting track to maintain the positioning of the mount assembly relative to the top-loading mounting track.

In at least some embodiments, the angled guide-surface portions 249a, 249b extend linearly. In at least some embodiments, the angled guide-surface portions 249a, 249b extend linearly between the insertion-pocket portions 261a, 261b, respectively, and the beams 251a, 251b, respectively, without forming any bumps, protrusions, undulations, or the like. It is advantageous to provide flat surfaces to reliably guide the flange 387 from the shoulder portions 247a, 247b to the beams 251a, 251b without one end of the flange 387 getting caught along one of the angled guide-surface portions 249a, 249b and potentially causing an unreliable seating of the flange 387 against the bottom surfaces 255a, 255b of the beams 251a, 251b. For example, a portion of the inner rail wall may become squeezed between the flange and the ball mount. An unreliable seating of the flange 387 against the bottom surfaces 255a, 255b of the beams 251a, 251b may cause the tightening of the mount assembly to the track section to be undesirably prone to loosening over time.

In at least some embodiments (and as described above, with reference to FIG. 2B), the bottom surfaces 255a, 255b of the beams 251a, 251b, respectively, are angled relative to the horizontal axis of the track section It is advantageous to angle the bottom surfaces 255a, 255b of the beams 251a, 251b relative to the horizontal axis to promote a centered, secure, and reliable seating for the flange 387 against the beams 251*a*, 251*b* when the mount assembly is retained by the track section.

Figure 4A:
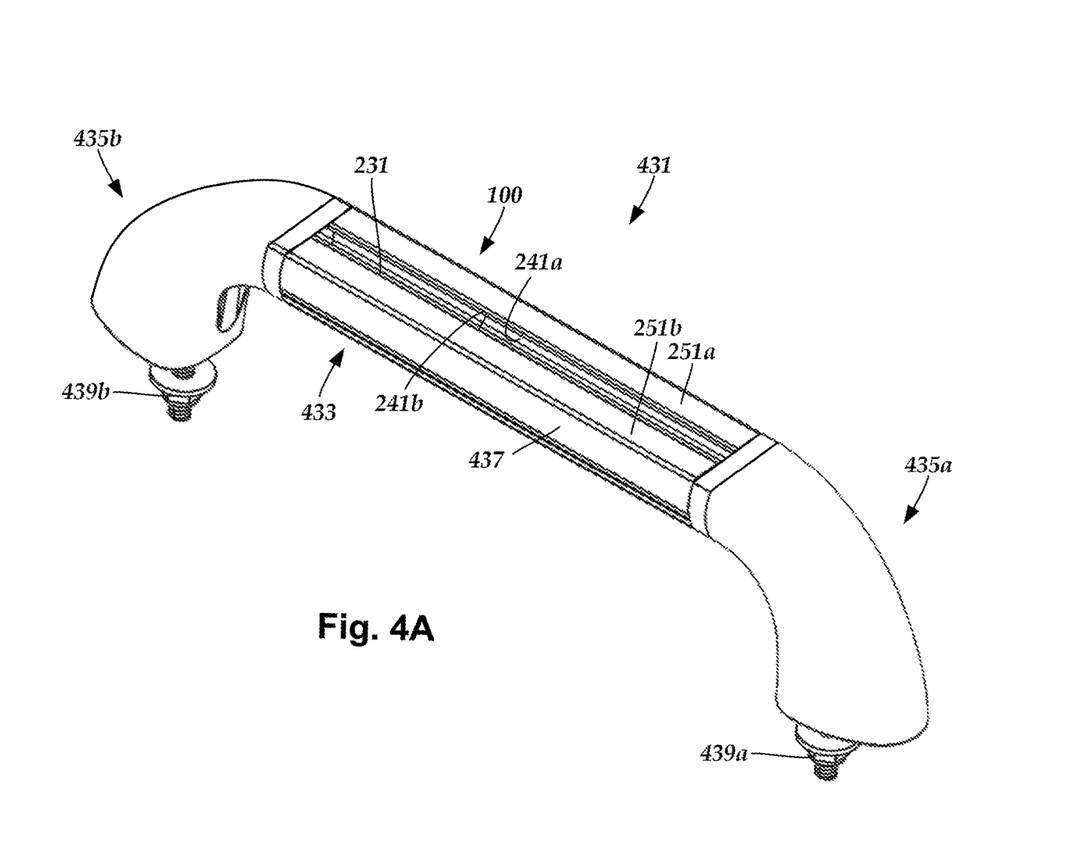
FIG. 4A is a schematic perspective view of one embodiment of the top-loading mounting track of FIG. 2 disposed along a handle suitable for mounting to a surface, according to the invention.
Figure 4B:
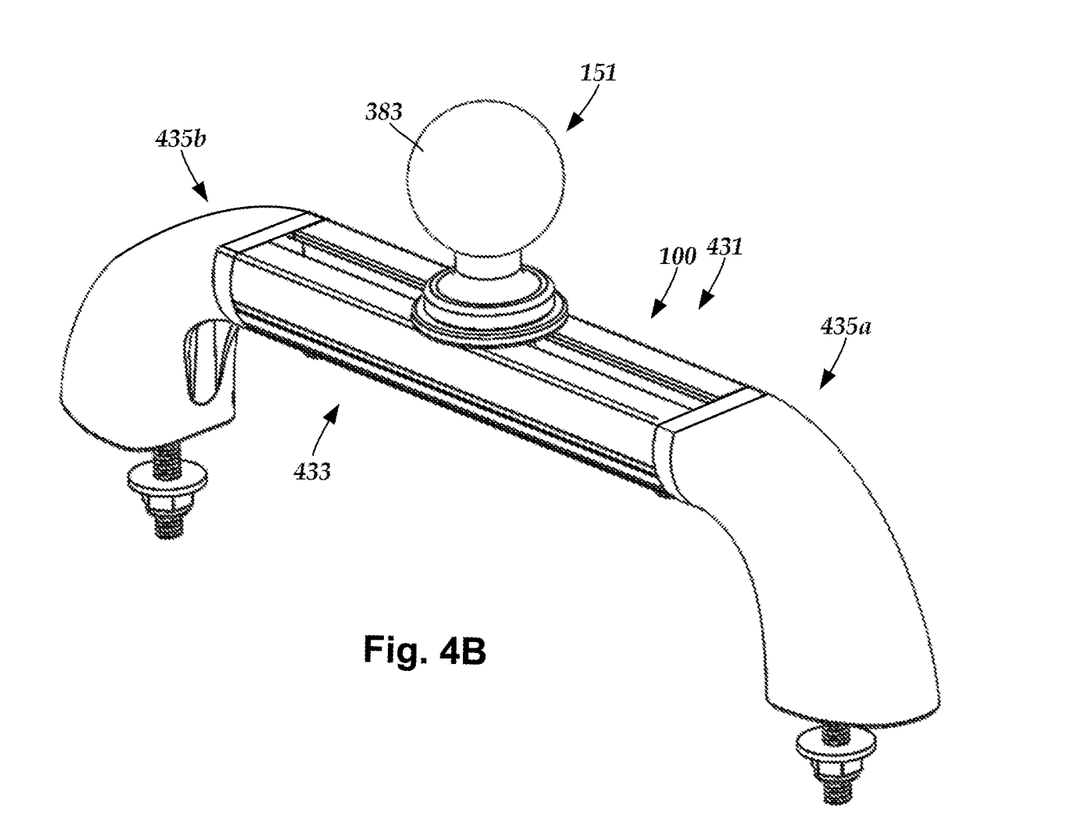
FIG. 4B is a schematic perspective view of one embodiment of a mount assembly received by the top-loading mounting track and handle of FIG. 4A, according to the invention.

Turning to FIGS. 4A-4B, in some embodiments the top-loading mounting track is disposed along a handle. One or more legs of the handle can be used to attach the handle to a surface. When the one or more legs of the handle are attached to a surface, the handle forms a graspable handle.

FIG. 4A shows, in schematic perspective view, one embodiment of a handle 431 that includes the top-loading mounting track 100. FIG. 4B shows, in schematic perspective view, one embodiment of the mount assembly 151 received by the top-loading mounting track 100.

The handle 431 includes a handle section 433 and legs 435*a*, 435*b* that are attachable to a surface. The top-loading mounting track 100 is formed along at least a portion of the handle section 433. In the illustrated embodiment, the handle 431 includes two legs 435*a* and 435*b*. Any suitable number of legs can be used to attach the handle to a surface including, for example, one, two, three, four, five, or more legs. In the illustrated embodiment, the legs 435*a* and 435*b* are shown disposed along opposing ends of the handle section 433. The leg(s) can be coupled to the handle section at any suitable location(s) along a length of the handle section including one or more of the ends, or an intermediate portion, or a combination of one or more of the ends and an intermediate portion.

In at least some embodiments, the handle section 433 includes a gripping surface 437 that extends beneath the top-loading mounting track 100 and couples together the two horizontal track beams 251*a*, 251*b*. The gripping surface 437 may facilitate grasping of the handle. In at least some embodiments, the gripping surface 437 extends along an entire longitudinal length of the handle section 433. In at least some embodiments, the track base 231, two vertical track rails 133*a*, 133*b*, two beams 251*a*, 251*b*, and gripping surface 437 collectively form a continuous path of material along an axis transverse to a longitudinal length of the handle section 433.

The leg(s) may be attachable to a surface in any suitable manner (e.g., one or more fasteners, adhesive, or the like or combinations thereof). In the illustrated embodiment, the legs 435*a*, 435*b* are attachable to a surface, at least in part, using surface fasteners 439*a*, 439*b*, respectively. Any suitable type of fastener may be used including, for example, screws, bolts, pins, or the like or combinations thereof. When fasteners are used to attach the leg(s) to a surface, any suitable number of fasteners can be used per leg (e.g., one, two, three, four, five, or more fasteners). In the illustrated embodiment, a single surface fastener 439*a*, 439*b* is used for attaching each leg 435*a*, 435*b*, respectively, to a surface.

In at least some embodiments, the leg(s) are configured to separate the handle section 433 of the handle 431 from a surface to which the leg(s) are attached. In at least some embodiments, the legs extend from the handle in a direction that is approximately orthogonal to a longitudinal length of the handle section 433. When the one or more legs are attached to a surface, the handle section forms a graspable handle. The graspable handle may advantageous. A user can, for example, use the handle to pick-up the object having the surface to which the one or more legs are attached. As another example, a user can, in some instances, use the handle to facilitate climbing up on, or into, the object having the surface to which the one or more legs are attached.

Figure 5A:
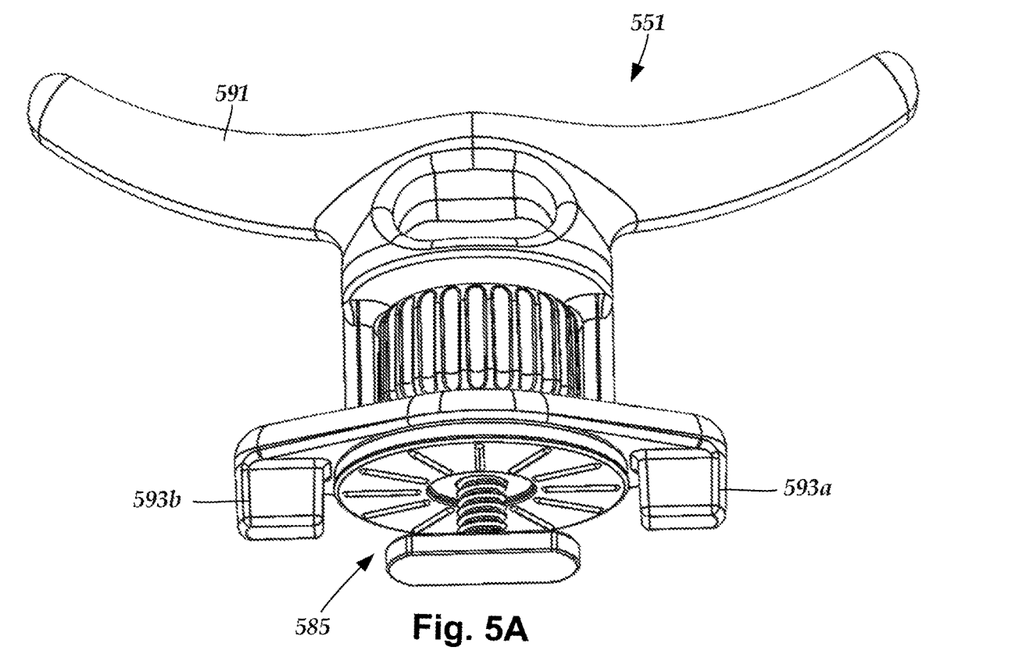
FIG. 5A is a schematic perspective view of another embodiment of a mount assembly suitable for being received by the top-loading mounting track of FIG. 2, according to the invention.
Figure 5B:
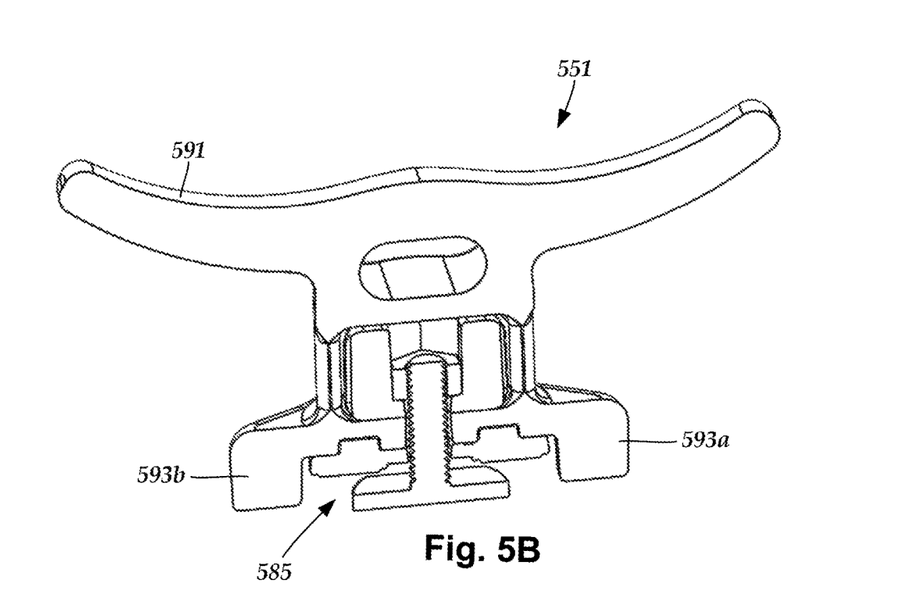
FIG. 5B is a schematic perspective cross-sectional view of one embodiment of the mount assembly of FIG. 5A, according to the invention.

Turning to FIGS. 5A-5B, in the above descriptions, ball mounts have been described. It will be understood, however, that mount assemblies are not limited to ball mounts and may include any suitable type of mount. The choice of different mounts may, in some instances, be determined based, at least in part, on the particular functionality desired. In at least some embodiments, mounts can be removed from the elongated member and swapped out for other mounts, as desired.

In at least some embodiments, the mounting assembly includes a cleat. FIG. 5A shows, in schematic perspective view, one embodiment of a mount assembly 551 suitable for being received by a top-loading mounting track. FIG. 5B shows, in schematic cross-sectional perspective view, one embodiment of the mount assembly 551.

As shown in FIGS. 5A-5B, the mount assembly 551 includes a mount that is formed as a cleat 591 and is attached to a retention element 585. In some embodiments, the cleat 591 includes one or more optional guide features 593*a*, 593*b* for facilitating the maintaining of a particular orientation of the cleat 591 relative to the top-loading mounting track when received by the mounting track. In at least some embodiments, the guide features 593*a*, 593*b* are insertable into the top-loading mounting track for facilitating the maintaining of a particular orientation of the cleat 591 relative to the mounting track where the mount is retained.

In at least some embodiments, the top-loading mounting track is configured and arranged to concurrently receive multiple mounting assemblies. When the top-loading mounting track concurrently receives multiple mounting assemblies, the individual mounting assemblies can be exclusively one type of mount (e.g., ball or cleat), or can include multiple types of mounts (e.g., ball and cleat). Other types of mounts are attachable to retention elements in addition to, or in lieu of, either balls or cleats.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A top-loading mounting track system, comprising:
   a top-loading mounting track comprising
      at least one top-loading track section, each top-loading track section comprising
         a base,
         two beams, wherein each of the beams extends over a portion of the base toward the other beam, wherein each of the beams has a top surface and an opposing bottom surface, wherein the beams are laterally spaced apart from each other by a gap having a first distance, and
         two rails extending opposite each other from the base, each rail of the two rails connecting the base to a different one of the two beams, each rail comprising an inner rail wall and an opposing outer rail wall, wherein the inner rail wall of each of the two rails defines
            a shoulder portion of the inner rail wall extending from the base and forming a shoulder relative to the base,
            an insertion-pocket portion of the inner rail wall extending from the shoulder portion and towards the opposing outer rail wall, and
            an angled guide-surface portion of the inner rail wall extending linearly, and at an angle away from the opposing outer rail wall, from the insertion-pocket portion to an intersection with the bottom surface of one of the two beams;

wherein the insertion-pocket portions of the inner rail walls of the two rails are laterally spaced apart from each other by a second distance that is larger than the first distance and the intersections of the respective angled guide-surface portions with the respective bottom surfaces of the two beams are laterally spaced apart from each other by a third distance that is larger than the first distance and smaller than the second distance; and a mount assembly coupleable to the top-loading mounting track, the mount assembly comprising a mount coupled to a retention element comprising a flange with a smallest lateral dimension that is greater than the first distance of the gap between the two beams of the top-loading mounting track and at least one lateral dimension that is less than the second distance between the insertion-pocket portions of the two rails of the top-loading mounting track, the retention element configured and arranged for insertion into the top-loading mounting track by passing the retention element through the gap between the two beams of the at least one top-loading track section from a position over the top surfaces of the two beams.

2. The top-loading mounting track system of claim 1, wherein the bottom surface of each of the two beams forms an angle with a first axis of the at least one top-loading track section, defined by opposing tips of the two beams, that is no less than 1 degree and no more than 10 degrees.

3. The top-loading mounting track system of claim 1, wherein the angled guide-surface portion of each of the two rails forms an angle with a second axis of the at least one top-loading track section, perpendicular to the base, that is no less than 20 degrees and no more than 60 degrees.

4. The top-loading mounting track system of claim 1, wherein the angled guide-surface portion of each of the two rails forms an angle with a second axis of the at least one top-loading track section, perpendicular to the base, that is no less than 25 degrees and no more than 45 degrees.

5. The top-loading mounting track system of claim 1, wherein the angled guide-surface portion of each of the two rails extends linearly between the insertion-pocket portion and the bottom surface of one of the two beams without forming any bumps, protrusions, or undulations.

6. The top-loading mounting track system of claim 1, wherein the insertion-pocket portion of each of the two rails extends to a position that is below a topmost part of the shoulder portion from which the insertion-pocket portion extends.

7. The top-loading mounting track system of claim 1, wherein the at least one top-loading track section has a first end and an opposing second end, and wherein each of the first end and the second end are closed.

8. The top-loading mounting track system of claim 1, further comprising at least one additional track section coupled to the at least one top-loading track section to form a continuous track with the at least one top-loading track section.

9. The top-loading mounting track system of claim 1, wherein the at least one top-loading track section defines a fastening aperture disposed along the base between the shoulder portions of each of the two rails, the fastening aperture configured and arranged for receiving a fastener for fastening the at least one top-loading track section to a surface.

10. The top-loading track-mounting track system of claim 1, wherein the retention element is one of a T-bolt or a T-nut.

11. The top-loading track-mounting track system of claim 1, wherein the mount is one of a ball or a cleat.

12. A method of coupling a mount assembly to a top-loading mounting track, the method comprising:

providing the top-loading mounting track system of claim 1; and inserting the retention element of the mount assembly into the at least one top-loading track section of the top-loading mounting track from a position over the top surfaces of the two beams of the at least one top-loading track section to retain the retention element within the top-loading mounting track.

13. The method of claim 12, wherein inserting retention element of mount assembly into the at least one top-loading track section comprises:

tilting the mount assembly to a non-parallel angle relative to a first axis of the at least one top-loading track section, the first axis defined by opposing tips of the two beams of the at least one top-loading track section;

extending a first end of the retention element through the gap between the two beams of the at least one top-loading track section and into the insertion-pocket portion of one of the two rails; and pivoting the mount assembly about the first end of the retention element to extend an opposing second end of the retention element through the gap between the two beams and into the insertion-pocket portions of the other of the two rails.

14. The method of claim 12, further comprising tightening the mount assembly against the at least one top-loading track section to retain the mount assembly at a mounting location along a length of the top-loading mounting track.

15. The method of claim 14, wherein tightening the mount assembly against the at least one top-loading track section comprises moving the retention element from the insertion-pocket portions away from the base along the angled guide-surface portions of the two rails to the bottom surfaces of the two beams, the angled guide-surface portions of the two rails facilitating guidance of the retention element to a position beneath the bottom surfaces of the two beams; and pressing the two beams between a top surface of the retention element and a bottom surface of a mount of the mount assembly to retain the mount assembly.

16. The method of claim 12, further comprising fastening the top-loading mounting track to a surface.

17. The method of claim 12, further comprising disposing the top-loading mounting track along a handle section of a handle that comprises at least one leg attachable to the handle section.

18. The method of claim 9, further comprising fastening the at least one leg to a surface.

19. The top-loading track system of claim 1, further comprising a handle section; and at least one leg extending from the handle section and attachable to a surface;

wherein the top-loading mounting track is disposed along at least a portion of the handle section and, when the at least one leg is attached to the surface, the handle section forms a graspable handle.

* * * * *